(12) United States Patent
Heldoorn

(10) Patent No.: US 7,472,565 B1
(45) Date of Patent: Jan. 6, 2009

(54) PLASTIC TAKEOUT HOLDER AND CERAMIC INSERT FOR USE IN BOTTLE MANUFACTURING

(76) Inventor: Fred Lawrence Heldoorn, 1323 Byron Nelson Pkwy., South Lake, TX (US) 76092

( * ) Notice: Subject to any disclaimer, the term of this patent is extended or adjusted under 35 U.S.C. 154(b) by 470 days.

(21) Appl. No.: 10/783,452

(22) Filed: Feb. 20, 2004

Related U.S. Application Data

(60) Provisional application No. 60/461,542, filed on Apr. 9, 2003.

(51) Int. Cl.
*C03B 9/04* (2006.01)
*C03B 9/44* (2006.01)

(52) U.S. Cl. .................. 65/260; 65/172; 65/374.15; 294/86.4; 294/902; 269/268; 269/284; 269/283

(58) Field of Classification Search .................. 65/260, 65/262, 272, 357; 427/255.13
See application file for complete search history.

(56) References Cited

U.S. PATENT DOCUMENTS

| | | | | |
|---|---|---|---|---|
| 1,919,322 A | * | 7/1933 | Dressler | 427/255.13 |
| 3,341,315 A | * | 9/1967 | Patschorke | 65/304 |
| 3,473,938 A | * | 10/1969 | Oberlin | 501/107 |
| 4,090,881 A | * | 5/1978 | Keel et al. | 501/95.1 |
| 4,606,960 A | * | 8/1986 | Angel et al. | 428/116 |
| 4,865,897 A | * | 9/1989 | Bode et al. | 428/137 |
| 4,900,807 A | * | 2/1990 | Nishikawa et al. | 528/362 |
| RE34,953 E | * | 5/1995 | Denney et al. | 65/260 |
| 5,741,343 A | * | 4/1998 | Lloyd et al. | 65/260 |
| 6,202,734 B1 | * | 3/2001 | Sackinger et al. | 164/271 |
| 6,517,597 B2 | * | 2/2003 | Filges et al. | 55/435 |
| 6,523,768 B2 | * | 2/2003 | Recker et al. | 241/294 |
| 6,805,832 B2 | * | 10/2004 | Mohler et al. | 266/48 |
| 2006/0230789 A1 | * | 10/2006 | Lang | 65/260 |

FOREIGN PATENT DOCUMENTS

| | | | | |
|---|---|---|---|---|
| GB | 2126211 A | * | 3/1984 | |
| JP | 04160065 A | * | 6/1992 | |

* cited by examiner

*Primary Examiner*—Philip C Tucker
*Assistant Examiner*—Phu H Nguyen
(74) *Attorney, Agent, or Firm*—Edwin S. Flores; Daniel J. Chalker; Chalker Flores, LLP

(57) ABSTRACT

A takeout holder including a takeout jaw formed of plastic.

14 Claims, 6 Drawing Sheets

PLASTIC TAKEOUT HOLDER AND CERAMIC INSERT FOR USE IN BOTTLE MANUFACTURING

CROSS REFERENCE TO RELATED APPLICATIONS

This application for patent is related to and claims priority benefit of U.S. Provisional Patent Application Ser. No. 60/461,542, filed Apr. 9, 2003 by inventor Fred Heldoorn, entitled "One-Piece Takeout Holder," currently pending.

FIELD OF INVENTION

The present invention relates in general to glass bottle manufacturing and in particular to takeout holders and associated inserts.

BACKGROUND OF INVENTION

The specifics of the new invention are related to the fixture which is used to lift hot glass bottles from the forming molds and carry them to the cooling table. Past technology has utilized a metallic takeout holder and a nonmetallic insert specially adapted to contact the bottle and carry it to the cooling table.

In the forming and processing of hot glass shapes into bottles, these bottles are susceptible to being damaged by the processing equipment. Most of the processing equipment used in the manufacturing of hot glass products is fabricated from metallic materials such as brass, stainless steel, and other alloys. It is understood that the actual contact point of the holder to the hot glass bottle is benefited by use of non-metallic material such as is asbestos, carbon fiber, and graphite.

In the manufacturing of glass bottles, the manufacturing equipment uses a fixture referred to as a bottle takeout "holder". This holder lifts and carries the newly formed hot bottles to a cooling table, before they proceed to an annealing furnace. Today's takeout holder's are fabricated from metallic materials such as steel, stainless steel, or brass with a separate, nonmetallic insert, which comes in direct contact with each bottle. This decreases the chances of checking or cracking due to localized heat transfer or thermal shock.

The most successful material used with the prior takeout holder insert is graphite, although it has the drawback of its high-cost in manufacturing from a raw billet. One disadvantage is the significant wear observed at the point where the two materials are joined, due to movement between the soft nonmetallic insert and the hard abrasive metallic holder. Spring clips are used to hold movement to a minimum. Spring clips fatigue and the inserts fall-out of the takeout holder. Further, spring clips allow wear between the holder and the insert due to the movement in high production bottling operations. Still another disadvantage is chipping, cracking and oxidation of the graphite inserts, which affect service life, and require more maintenance. The new product of this invention will all but eliminate chipping, cracking, and oxidation in this case.

SUMMARY OF INVENTION

This new invention eliminates problems with previous designs, which provide a takeout holder and insert to be manufactured from dissimilar materials and under spring tension to reduce movement in relation to each other. This new invention will provide a longer life expectancy with the use of energy saving high temperature engineered plastics. This new invention will replace the old two-piece holder and insert with a plastic holder and a ceramic insert.

This process will reduce both time and cost in manufacturing. Bottle head contouring can be addressed in the design of the die in which the ceramic insert is formed, allowing large quantities to be produced and eliminating all machining processes. There are many advantages in the use of this new, high strength, heat resistant, plastic holder and ceramic insert. The cost of manufacturing is reduced. The new plastic holder is resistance to cracking and chipping, generating higher yields of bottle product.

In a further embodiment, a two-piece design is disclosed which includes a wedge-shaped insert which is firmly wedged between corresponding wedge-shaped walls of a corresponding holder. Advantageously, movement between the insert and holder during bottle-making operations is substantially reduced or eliminated, thereby reducing the wear problems found with prior art holders and inserts. Moreover, this embodiment also eliminates the need for a clip and disadvantages associated with such a clip.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-3F of the drawings, in which like numbers designate like parts.

Figure 1:
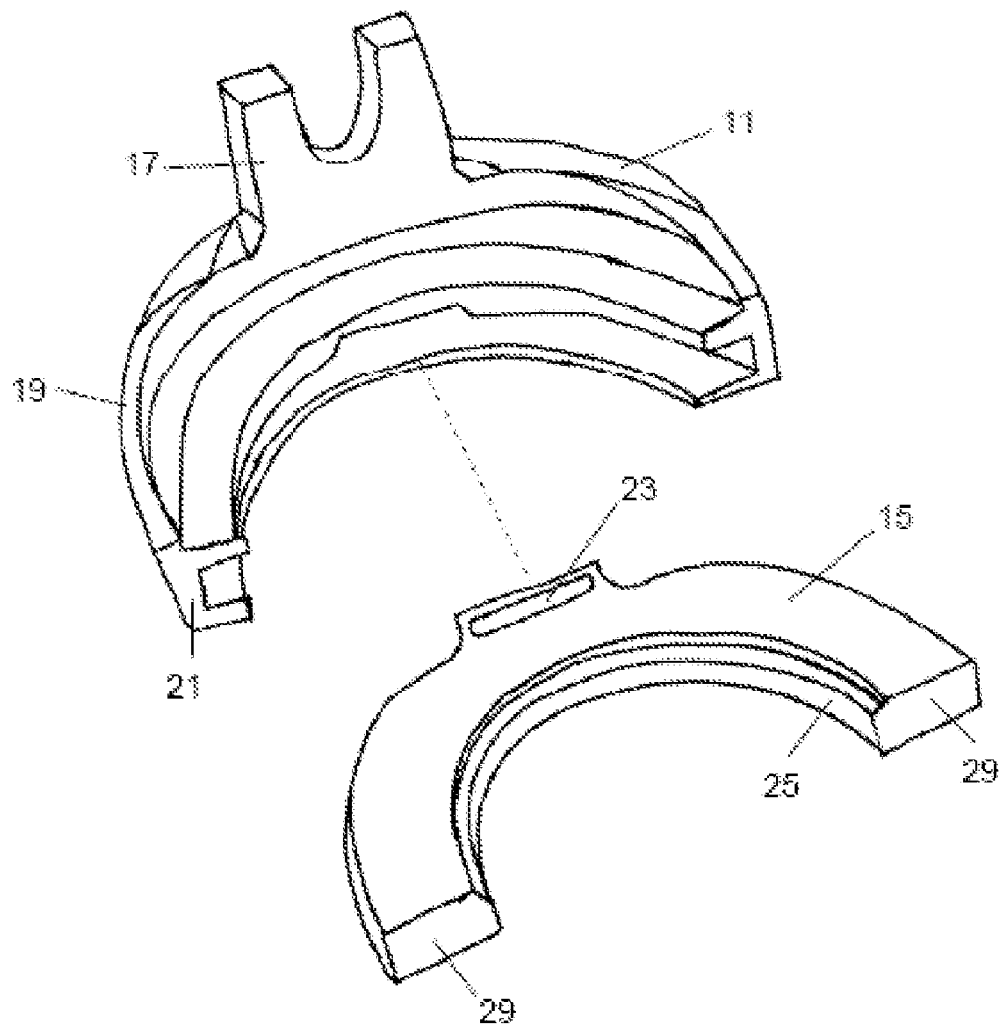
FIG. 1 illustrates a perspective view of the takeout jaw and insert of the present invention, in accordance with a preferred embodiment.

In FIG. 1, there is shown a takeout jaw 11 and an insert 15. The takeout jaw 11 is substantially similar to the takeout jaw of U.S. Pat. No. RE. 34,953, the entire disclosure of which is incorporated herein by reference. The takeout jaw has a yoke 17 for attachment to a lifting arm. In addition, the takeout jaw has a semicircular body 19. A semicircular groove 21 is formed to receive the insert 15.

The insert 15 is shaped substantially similar to the insert of U.S. Pat. No. RE. 34,953, having a depression 23 and a hole therein for securing inside the takeout jaw 11. The insert 15 has a semicircular inside surface 25 for contacting the neck of a glass bottle 27 (see FIG. 2). The inside surface 25 can be flat, contoured to match the bottle or threaded to match the bottle threads. The insert 15 has two flat surfaces 29 for alignment with the flat surfaces of an opposing insert contained in an opposing takeout jaw.

The insert 15 is secured within the takeout jaw 11 by a spring clip as discussed in RE. 34,953.

The insert 15 is made from a moldable high temperature plastic which will withstand the temperature of the glass bottle while maintaining shape and function. In the preferred embodiment, the plastic can be one of the following: a graphite mineral phenolic resin, a glass fiber phenolic, a mineral glass fiber phenolic or a mineral phenolic. Each of the above plastics is of the thermoset type and can be molded. It is preferred that the inserts be molded. The prior art inserts, made of graphite, must be machined. Machining graphite is difficult, hard on equipment and reduces air quality because of the dust particles formed.

Figure 2:
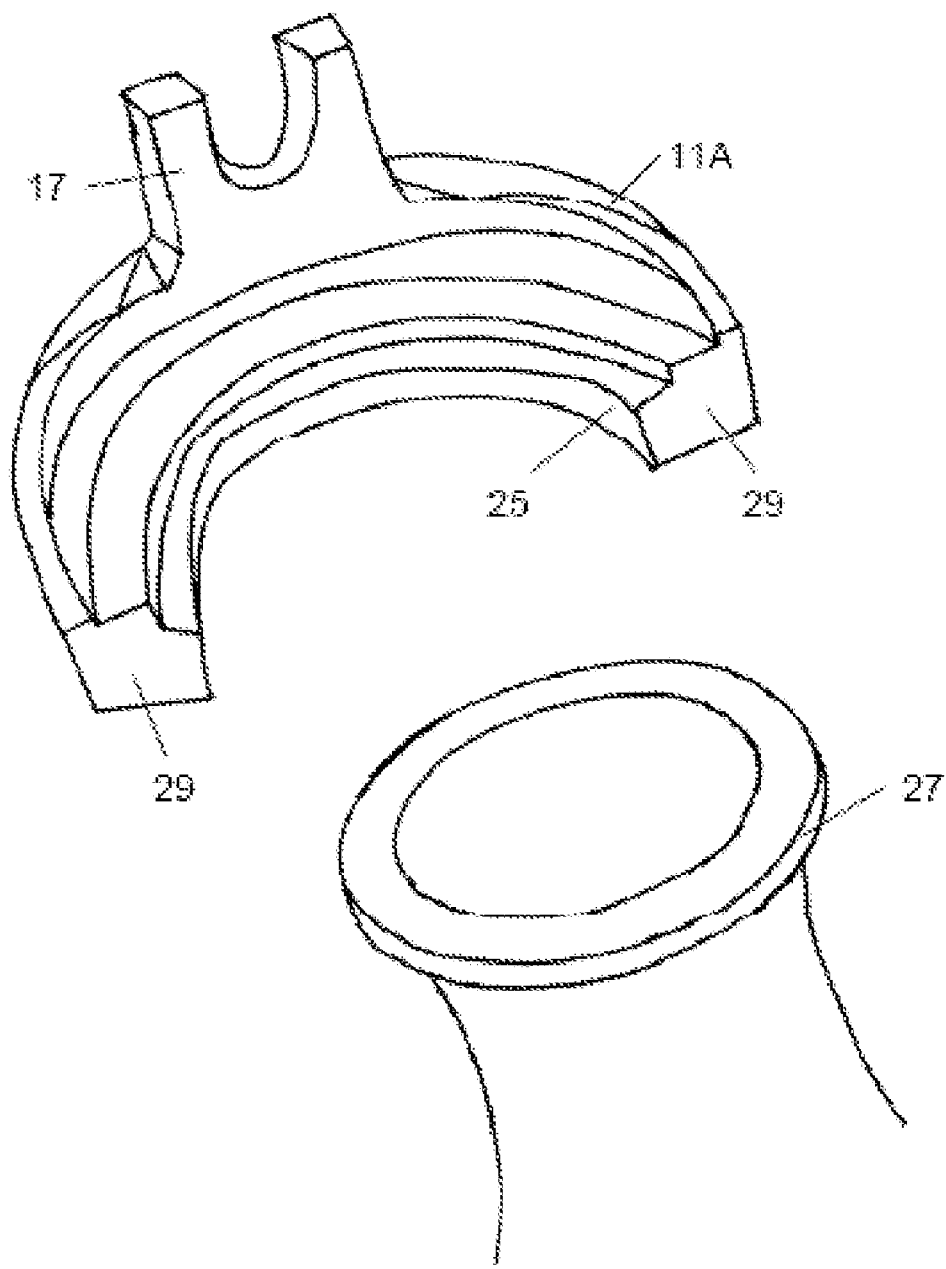
FIG. 2 illustrates a perspective view of the single piece takeout jaw, in accordance with another embodiment, shown in conjunction with a glass bottle.

FIG. 2 shows a one-piece takeout jaw and insert combined into a single molded component 11A. The takeout jaw 11A is made of the same material as the insert 15 of FIG. 1. Because the takeout jaw and insert are integral, no channel 21 is required. Also, there is no relative movement between the inside surface 25 and the yoke 17, thereby reducing wear. The cost to manufacture the takeout jaw 11A is less than manufacturing the components 11, 15 of FIG. 1.

This invention is a major improvement to patent number RE. 34,953. The takeout holders and inserts of patent number RE. 34,951 have a shorter life expectancy and bottle yield. With dissimilar materials creating frequent downtime with changing of worn parts. The hundreds of hours lost in precision machining of both products.

The new design of the takeout holder 11A of this new invention are all in one-piece allows for the injection mold to combine both pieces and eliminates the excessive hours of precision machining, not to mention the hours of inspection required and tooling costs. It also permits a more precise holder with both dimensions and alignment insured. Which in turn permits a more accurate location on the bottle due to misalignment. With injection molding of the holder 11A as one-piece, the inside surface 25 could include a bottle neck contour in the molding process when produced in mass quantities. In the prior art with a total insert failure, the metallic holders were exposed to the fragile product. With the use of nonmetallic holders, the product's safety is ensured. The new high temperature engineered plastics will ensure protection against cracking and chipping a common problem with the existing graphite inserts. These material and process advancements will insure higher yield with lower cost to both holders and product.

Figure 3A:
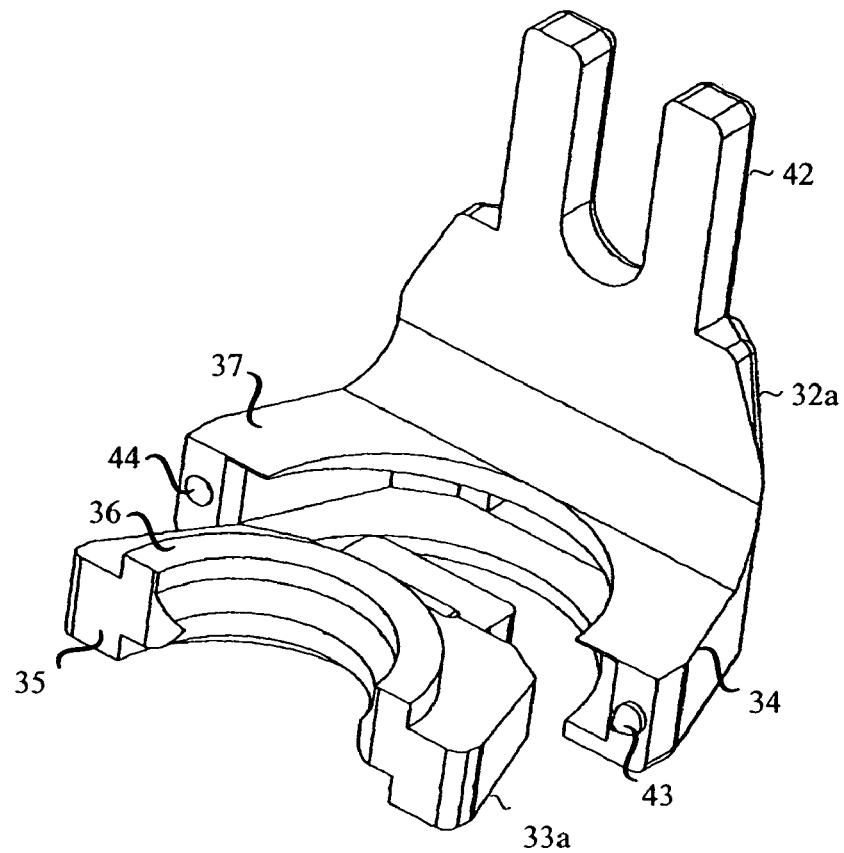
FIG. 3A are perspective views of left and right takeout jaws, which, along with the associated inserts, comprise a takeout holder according to a third embodiment of the present invention.
Figure 3A:
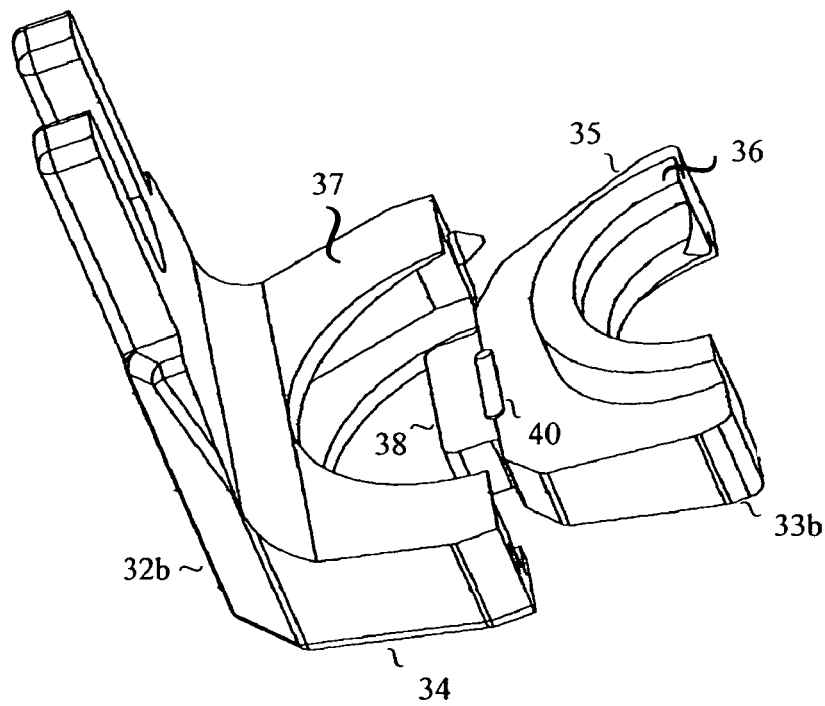
Figure 3B:
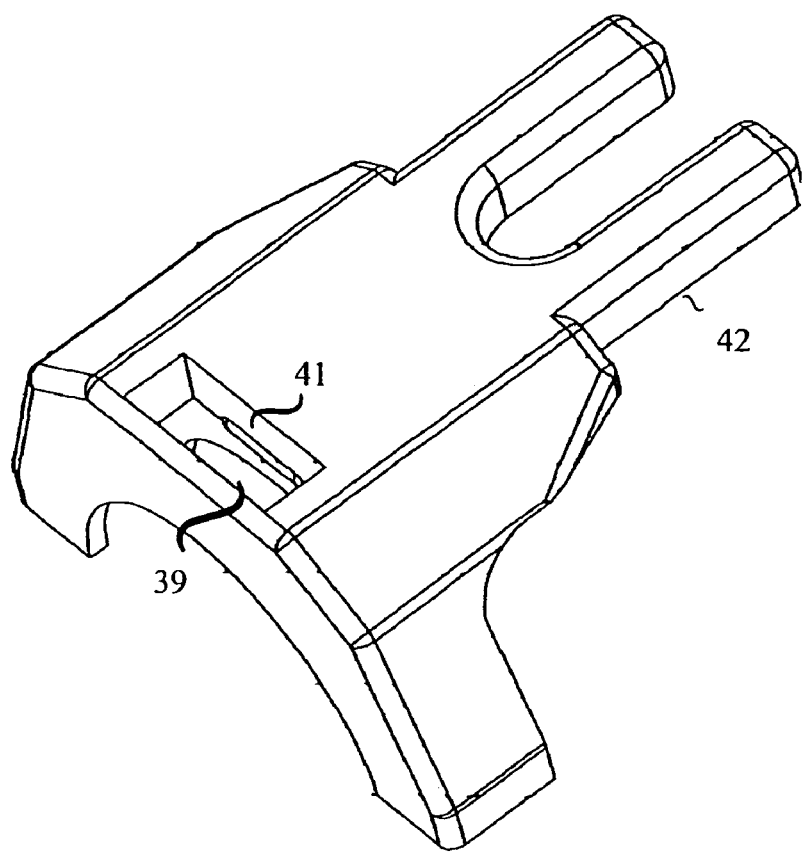
FIG. 3B is a rear perspective view of a selected one of the takeout jaws shown in FIG. 3A.

FIG. 3A illustrates left and right takeout jaws 32a-32b, and associated semicircular inserts, 33a and 33b, according to a third embodiment of the present invention. Each takeout jaw 32a and 32b includes a plastic body 34 which defines a semicircular aperture which receives the corresponding insert 33a or 33b, as discussed further below. Exemplary plastics include Plenco® two-stage phenolic compression molded plastics Nos. 06553, 04349, 05350, and 06582, and Phillips 66 Ryton® A-200 polyphenylene sulfide.

In the preferred embodiment, inserts 33a and 33b are formed of ceramic composed of clay or a similar substrate material and alumina. For example, in one particular embodiment, the ceramic is nominally composed of 40-45% mulcona 60 alumina, 35-40% D6 clay, 10-15% talc, 5-10% spinks clay, and 1-5% feldspar, fit or other releasing agent. A clear glaze sealant may also be used. Advantageously, alumina dissipates heat, which allows inserts 33a and 33b to dissipate the heat from encircled bottle neck. Ceramic embodiments of inserts 33a and 33b also have improved wear shock resistance over graphite inserts.

Furthermore, ceramic inserts 33a and 33b according to the inventive principles are much easier to manufacture than prior art graphite and metal inserts, since extensive machining is not required. In particular, to form inserts 33a and 33b, a die is constructed to the desired size and shape of inserts 33a and 33b. The desired ceramic material is then placed in the die and pressed into shape. The resulting raw insert 33a or 33b is then fired to hardened. In further embodiments, the given insert 33a or 33b is then glazed and re-fired to produce a glossy appearance and enhance life.

Inserts 33a and 33b include a wedge shaped body 35 including a semicircular extension 36 which snuggly engages the semicircular upper wall 37 of takeout jaws bodies 34a and 34b. Each insert 33a and 33b also includes an extension 38 which inserts into a corresponding aperture 39 of the associated takeout jaw body 34, as shown in the rear perspective view of FIG. 3B. Inserts 33a and 33b further include an elongated male extension (not shown) (See FIG. 3E for the elongated male extension 40) which engages a corresponding elongated female depression 41 in takeout jaw body 34 when extension 38 of the given insert 33a or 33b is inserted into aperture 39 of the associated takeout jaw body 34.

Thus, when wedge-shaped inserts 33a or 33b are inserted into the associated takeout jaw bodies 34, they are firmly locked in place. Each takeout jaw 32a-32b also includes a yoke 42 for attachment to associated bottle making machinery (not shown) and a male alignment pin 43 and a female alignment receptacle 44 to ensure that takeout jaws 32a and 32b are appropriately aligned and engaged during the bottle making process.

Figure 3C:
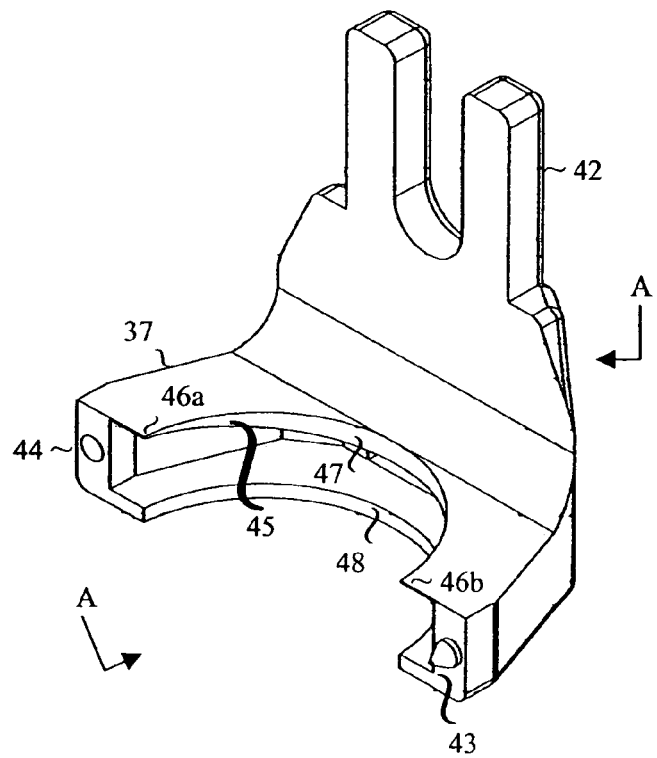
FIG. 3C shows a front perspective view of the right takeout jaw shown in FIG. 3A.
Figure 3D:
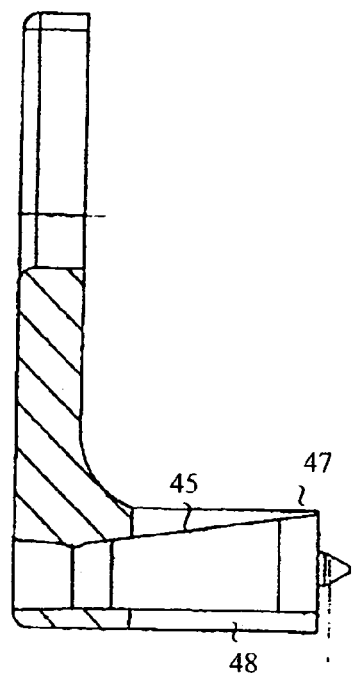
FIG. 3D is a cutaway view taken along line A-A of FIG. 3C.

As shown in further detail in FIG. 3D, which is a cutaway view taken along line A-A of FIG. 3C, upper inside surface 45 of semicircular upper wall 37 of body 34 is tapered moving along the semicircle. In other words, upper inside surface in formed by a top angle cut.

In particular, upper wall 37 of body 34 is thinnest at the distal points 46a-46b on the semicircle and thickest at the center point 47 of the semicircle. Semicircular lower wall 48 of semicircular body 37 is substantially flat. Therefore, sloped surface 45 and flat surface 48 are spaced apart vertically, to define a wedge-shaped slot which snuggly receives corresponding sloped and flat surfaces of the associated wedge-shaped insert 33.

Figure 3E:
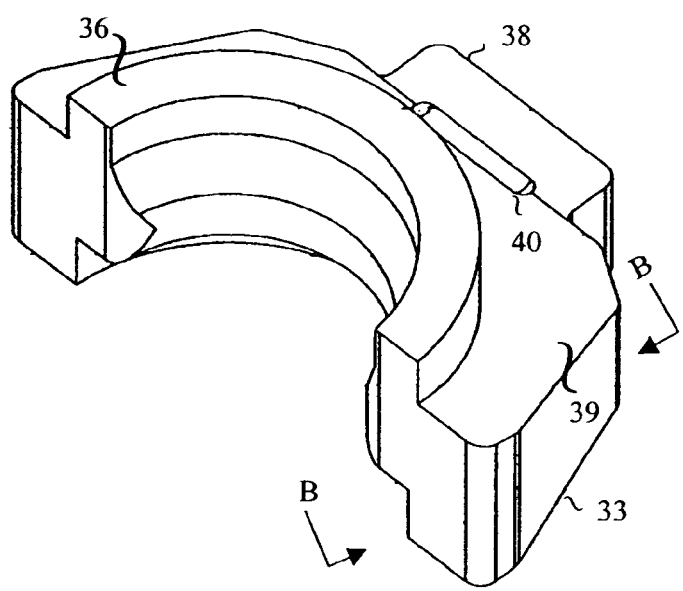
FIG. 3E is a front perspective view of a selected one of the inserts shown in FIG. 3A.
Figure 3F:
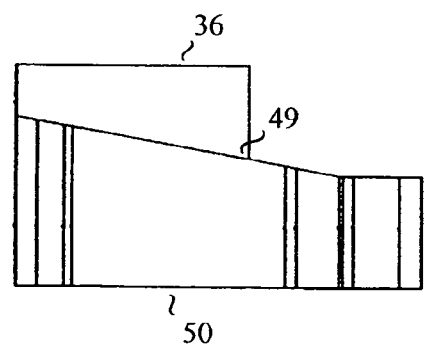
FIG. 3F is a cutaway view taken along line B-B of FIG. 3E.

A selected insert 33 is shown in FIG. 3E. FIG. 3F is a cut away view taken along line B-B of FIG. 3E. Each insert 33 includes a sloped upper surface 49 and a substantially flat lower surface 50 which define a wedge which snuggly fits within the wedge-shaped slot defined by sloped surface 45 and flat surface 48 of takeout jaw body 34.

During bottle making operations, wedge-shaped inserts 33a and 33b are inserted into the wedge-shaped slot defined by semicircular body 34 of takeout jaws 32a and 32b. Specifically, the sloped upper inside surface 37 of each takeout jaw 32a-32b mates with the sloped upper surface 49 of the corresponding insert 33, while the lower surface 48 of each takeout jaw 32a-32b engages the corresponding flat surface 50 of insert 33. The result is a wedging effect, in which the top surfaces generate a force against the lower surfaces, such that movement between inserts 33 and takeout jaws 32a-32b, thereby reducing or eliminating wear during bottle making operations. Moreover, in conjunction with detent 40 of insert 33 and female depression 41 of corresponding takeout jaw 32a-32b, the need for a spring clip is also eliminated.

The bottle making machinery attached to yoke 22 of each takeout jaw 32a and 32b direct the two takeout jaw-insert assemblies around the neck of a hot bottle, such as bottle 27 shown in FIG. 2. The neck of the hot bottle is then retained within the circular receptacle defined by semicircular inserts 33*a* and 33*b*. Alignment pins 43 and alignment receptacles 44 ensure that the two takeout jaws 32*a* and 32*b* are properly aligned during the procedure. Advantageously, as the bottle making machinery picks-up each bottle, wedge-shaped inserts 33 are forced back into the wedge-shaped slots defined by takeout jaws 32*a*-32*b*, such that the pressure between inserts and takeout jaws becomes greater and greater, thereby further reducing the probability of wear.

In sum, heat resistant plastic suitable for constructing bottle holders have been available for many years. For example, the Ryton® plastic was substantially developed by the earlier 1970's. Notwithstanding, it was not until the present invention that plastics were proposed and successfully used to manufacture bottle holders. Similarly, ceramics are well-known, although never used in the construction of bottle holder inserts. This is especially true with respects to ceramics composed of alumina and alumina-zirconia composites. Among the advantages achieved by the plastic and ceramic embodiments of the present invention is ease in manufacture and a substantial reduction in manufacturing costs, in view of traditional devices made from metal, graphite and similar materials. For example, not only are these materials easier to work with and less expensive, but plastics can also be re-used, at least when thermoform plastics are selected.

While a particular embodiment of the invention has been shown and described, changes and modifications may be made therein without departing from the invention in its broader aspects, and, therefore, the aim in the appended claims is to cover all such changes and modifications as fall within the true spirit and scope of the invention.

What is claimed is:

1. A plastic takeout holder jaw adapted to fit a takeout holder machine to remove hot bottles from a bottle forming mold comprising:
    a semi-circular plastic takeout holder jaw base having a front edge having an inner wall that forms an insert opening in the front edge that extends toward a rear edge;
    a pocket within the inner wall formed by a bottom wall, a side wall and a top wall wherein the pocket is tapered with the pocket at the front edge wider than the pocket at the rear edge to form a wedge shaped profile from the front edge toward the rear edge adapted to frictionally fit a corresponding wedge shaped semi-circular insert;
    a tab aperture in the side wall of the pocket that mates to a corresponding tab on the wedge shaped semi-circular insert wherein the tab aperture comprises an elongated female depression that mates to a corresponding elongated male extension on the corresponding tab to frictionally secure removably the wedge shaped semi-circular insert within the pocket; and
    a yoke that extends generally perpendicularly from the semi-circular plastic takeout holder base, wherein the yoke is configured to fit a takeout holder machine used to remove hot bottles from a bottle forming mold and the plastic takeout holder jaw provides a longer life expectancy and is stable at temperatures at which the takeout holder machine removes the hot bottles from the bottle forming mold.

2. The plastic takeout holder jaw of claim 1 further comprising a wedge shaped semi-circular nonmetallic insert adapted to fit frictionally the pocket, wherein the wedge shaped semi-circular nonmetallic insert comprises a bottom and a top connected by a side insert wall that has a wedge shaped profile with a front insert edge that is taller than a rear insert edge;
    a bottle neck profile formed in the front edge to mate to a bottle neck; and
    a tab on the side insert wall to mate to the corresponding opening in the side wall of the pocket, wherein the tab comprises an elongated male extension that mates to the corresponding elongated female depression to frictionally secure removably the wedge shaped semi-circular nonmetallic insert within the pocket, wherein the wedge shaped semi-circular nonmetallic insert is stable at temperatures at which hot bottles are removed from a bottle forming mold.

3. The plastic takeout holder jaw of claim 2 wherein the wedge shaped semi-circular nonmetallic insert is formed of ceramic.

4. The plastic takeout holder jaw of claim 3 wherein the wedge shaped semi-circular nonmetallic insert is formed of ceramic composed in part of alumina-clay composite including a releasing agent.

5. The plastic takeout holder jaw of claim 2 wherein the wedge shaped semi-circular nonmetallic insert is formed of a ceramic composed in part of alumina.

6. The plastic takeout holder jaw of claim 1 wherein the plastic comprises thermoset plastic.

7. A molded takeout holder formed of a high temperature plastic used to remove hot bottles from a bottle forming device comprising:
    a plastic takeout jaw adapted to fit a takeout holder device comprising:
        a semi-circular plastic base having a front edge having an inner wall that forms a generally concave opening that extends toward a rear edge;
        a wedge shaped groove within the inner wall of the semi-circular plastic base formed by a bottom wall, a side wall and a top wall that tapers from the front edge to the rear edge, wherein the wedge shaped groove is wider at the front edge than at the rear edge to form a wedge shaped profile from the front edge to the rear edge;
        a receptacle having an elongated female depression positioned in the wedge shaped groove to engage lockably a détente on an extension on the insert;
        a yoke adapted to fit a takeout holder device that extends generally perpendicularly from the semi-circular plastic base, wherein the plastic takeout holder jaw comprises a high temperature plastic that is stable at temperatures at which hot bottles are removed from a bottle forming mold; and
    a concave wedge shaped nonmetallic insert adapted to fit frictionally the wedge shaped groove wherein the concave wedge shaped nonmetallic insert comprises:
        an insert front, an insert back and an insert side, wherein the insert side has a wedge shape profile with a front insert edge that is taller than a rear insert edge adapted to fit frictionally the wedge shaped groove;
        a bottle neck profile in the insert front profiled to mate to a bottle neck;
        an extension on the insert side positioned to fit the receptacle in the wedge shaped groove; and
        a détente on the extension positioned to engage lockably the elongated female depression positioned in the receptacle, wherein the concave wedge shaped nonmetallic insert is stable at temperatures at which hot bottles are removed from a bottle forming mold.

8. The plastic takeout holder of claim 7 wherein the plastic is selected from the group consisting of graphite mineral phenolic resin, glass fiber phenolic, mineral glass phenolic, or mineral phenolic.

9. The plastic takeout holder of claim 7 further comprising a second plastic takeout jaw comprising a second concave wedge shaped nonmetallic insert position symmetrically about the plastic takeout jaw to allow the concave wedge shaped nonmetallic insert and the second concave wedge shaped nonmetallic insert to surround a hot bottle for removal from bottle forming device.

10. The plastic takeout holder of claim 7 further comprising alignment means for aligning the takeout jaw with a symmetrical takeout jaw.

11. A wedge-shaped ceramic insert for a takeout holder comprising:
  a bottom insert wall, a top insert wall and a side insert walls that tapers from a wider front edge to a rear edge, wherein the side insert walls is wider at the front edge than at the rear edge, to form a wedge shaped profile adapted to frictionally fit a corresponding wedge shaped groove in the takeout holder jaw;
  the front edge comprising a bottle neck profile that corresponds to at least a portion of a bottle neck;
  an extension positioned about the side insert wall to extend onto an aperture in the takeout holder jaw, wherein the extension comprises an elongated male extension that mates to a corresponding elongated female depression in the aperture in the takeout holder jaw to frictionally secure removably the ceramic wedge shaped insert, wherein the wedge shaped ceramic insert is stable at temperatures at which hot bottles are removed from a bottle forming mold.

12. The wedge-shaped ceramic insert of claim 11 wherein the ceramic includes alumina.

13. The wedge-shaped ceramic insert of claim 11 wherein the ceramic includes alumina and a releasing agent.

14. The wedge-shaped ceramic insert of claim 11 wherein the ceramic is glazed.

* * * * *